United States Patent [19]
Nakai et al.

[11] Patent Number: 5,339,013
[45] Date of Patent: Aug. 16, 1994

[54] METHOD AND APPARATUS FOR DRIVING A BRUSHLESS MOTOR INCLUDING VARYING THE DUTY CYCLE IN RESPONSE TO VARIATIONS IN THE ROTATIONAL SPEED

[75] Inventors: Mitsuhisa Nakai; Shiro Maeda; Toshiaki Yagi, all of Kusatsu, Japan

[73] Assignee: Matsushita Electric Industrial Co., Ltd., Osaka, Japan

[21] Appl. No.: 57,458

[22] Filed: May 7, 1993

Related U.S. Application Data

[63] Continuation of Ser. No. 768,546, Sep. 30, 1991, abandoned.

[30] Foreign Application Priority Data

Feb. 14, 1990 [JP] Japan .................. 2-34322

[51] Int. Cl.⁵ .................................. H02P 7/00
[52] U.S. Cl. ........................ 318/254; 318/439
[58] Field of Search ........... 318/254, 439, 138; 388/804, 811, 817, 827, 904

[56] References Cited

U.S. PATENT DOCUMENTS

| | | | |
|---|---|---|---|
| 4,276,504 | 6/1981 | Nagase et al. | 318/802 X |
| 4,371,819 | 2/1983 | Kaufmann | 388/811 |
| 4,488,100 | 12/1984 | Fujii et al. | 318/806 X |
| 4,622,500 | 11/1986 | Budelman, Jr. | 388/804 |
| 4,638,225 | 1/1987 | Morinaga et al. | 388/804 |
| 4,734,628 | 3/1988 | Bench et al. | 388/804 |
| 4,743,815 | 5/1988 | Gee et al. | 318/254 |
| 4,767,976 | 8/1988 | Mutoh et al. | 318/802 |
| 4,814,675 | 3/1989 | Perilhon | 318/254 |
| 4,885,518 | 12/1989 | Schauder | 318/806 X |
| 4,910,448 | 3/1990 | Tomisawa et al. | 388/804 X |
| 4,928,043 | 5/1990 | Plunkett | 318/254 |
| 5,010,287 | 4/1991 | Mukai et al. | 318/801 |

FOREIGN PATENT DOCUMENTS

| | | |
|---|---|---|
| 1638036B2 | 1/1972 | Fed. Rep. of Germany . |
| 3890698C2 | 10/1989 | Fed. Rep. of Germany . |
| 61-88785 | 5/1986 | Japan . |
| 63-268487 | 11/1988 | Japan . |
| 199491A | 4/1989 | Japan . |

OTHER PUBLICATIONS

W. Maser, "Einfuhrung in die Probleme des Schrittmotorantriebs," STZ, No. 48, Nov. 1973, pp. 969–976.
H. Berhard, et al "Thyristoren," Vogel–Verlag, 1971, Wurzburg, ISBN 3-8023-0026-2, pp. 198–201.
K. Iizuka, et al "Microcomputer Control for Sensorless Brushless Motor," IEEE Transactions on Industry Applications, vol. IA-21, No. 4, May/Jun. 1985, pp. 595–601.

Primary Examiner—Jonathan Wysocki
Attorney, Agent, or Firm—Stevens, Davis, Miller & Mosher

[57] ABSTRACT

By making different duty controls at the time of change in rotating speed and at the time of stable rotating speed, respectively, it is possible to realize the driving of a brushless motor 3 which enables smooth and rapid change of a rotating speed coping with a load.

3 Claims, 6 Drawing Sheets

METHOD AND APPARATUS FOR DRIVING A BRUSHLESS MOTOR INCLUDING VARYING THE DUTY CYCLE IN RESPONSE TO VARIATIONS IN THE ROTATIONAL SPEED

This application is a continuation of application Ser. No. 07/768,546, filed Sep. 30, 1991 (abandoned).

TECHNICAL FIELD

The present invention relates to a brushless motor, and more particularly to a brushless motor driving method and apparatus in which the relative position of a magnet rotor and an armature winding is detected by a voltage induced in the armature winding and the change of a rotating speed is rapidly made coping with a load.

BACKGROUND ART

Usually, a brushless motor needs a detector for detecting the position of magnetic poles of a rotor of the motor. However, for example, in the case where the brushless motor is used in a compressor for an air conditioner, it is not possible to use such a rotor pole position detector since the reliability of the detector cannot be ensured under the conditions of high temperature and high pressure. Accordingly, in such applications a method is employed which uses no pole position detector and in which a voltage signal induced in an armature winding is detected and a commutation signal of the motor is generated on the basis of the detected voltage signal. A rotating speed is detected on the basis of the commutation signal used to drive the motor while always making a feedback control in order to cope with variations in load, as shown in FIG. 1.

However, for example, in the case of a large-sized brushless motor for driving of a compressor of an air conditioner, there is a need to frequently change a rotating speed in accordance with the state of air-conditioning of the interior and exterior of a room. In such applications a so-called pulse width modulation scheme is usually used in which a voltage is controlled by controlling the duty of a voltage signal pulse with a DC power source voltage being kept constant.

Accordingly, the use of the conventional driving method mentioned above involves a problem that the change of a rotating speed takes a considerable time, thereby missing the effect of an urgent protection control.

DISCLOSURE OF INVENTION

Therefore, the present invention is provided with a brushless motor driving apparatus comprising a three-phase armature winding connected in a neutral ungrounded fashion, a DC power source, a group of semiconductor switching elements for passing/interrupting a current to the armature winding, a brushless motor having a magnet rotor, rotating speed command means, position detection means for detecting the relative position of the armature winding and the magnet rotor in accordance with a voltage signal induced in the armature winding, driving signal generation means for generating a driving signal of the switching element group by use of an output signal of the position detection means, rotating speed comparison means for deciding a rotating speed by the use of the output signal of the position detection means and comparing the decided rotating speed with a rotating speed indicated from the rotating speed command means, duty command means, and pulse width modulation means for subjecting an output signal of the driving signal generation means to pulse width modulation on the basis of a command from the duty command means, in which at the time of change in rotating speed, the duty is changed on the basis of a predetermined rotating speed versus duty curve, and at the time of stable rotating speed, a feedback control is made with the duty being changed on the basis of a signal obtained through conversion of the voltage signal.

The gradient of the predetermined rotating speed versus duty curve may be changed so as to have different values at the time of low-speed rotation and at the time of high-speed rotation, respectively.

At the time of change in rotating speed, a duty based on the predetermined rotating speed versus duty curve is employed while making the summation of a difference between a duty obtained through the feedback control at the time of stable rotating speed and a duty obtained from the predetermined rotating speed versus duty curve. At this time, the employed duty is successively changed at an arbitrary speed. Thereby, it becomes possible to realize the driving of the brushless motor which enables smooth and rapid change of the rotating speed coping with a load.

Also, the provision of the change of the gradient of the predetermined rotating speed versus duty curve with different values at the time of low-speed rotation and at the time of high-speed rotation causes the increase of an application voltage at the time of low-speed rotation, thereby making it possible to prevent an out-of-step phenomenon which may be caused by the undershoot of the application voltage when transition to low-speed rotation is made or when the power source voltage is low.

BEST MODE FOR CARRYING OUT THE INVENTION

A first embodiment of the present invention will now be described in reference to the drawings.

Figure 1:
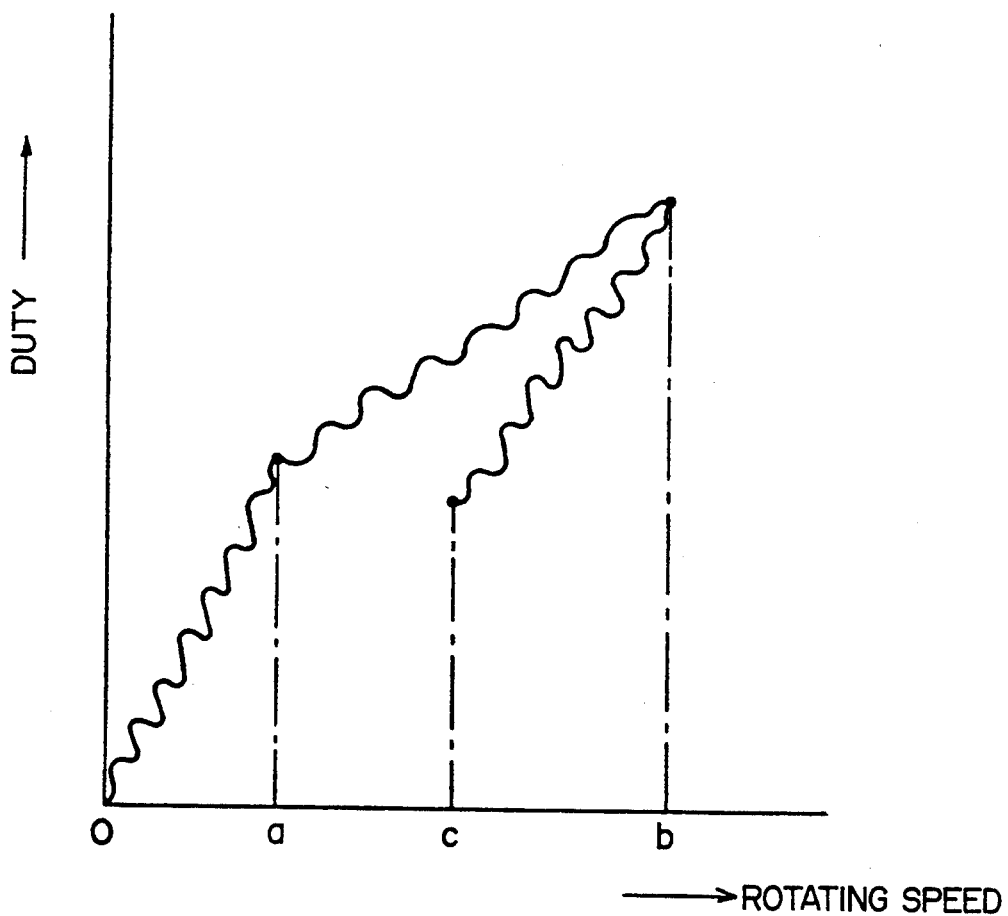
FIG. 1 is a diagram showing a relationship between the rotating speed and duty in the conventional brushless motor driving apparatus.
Figure 2:
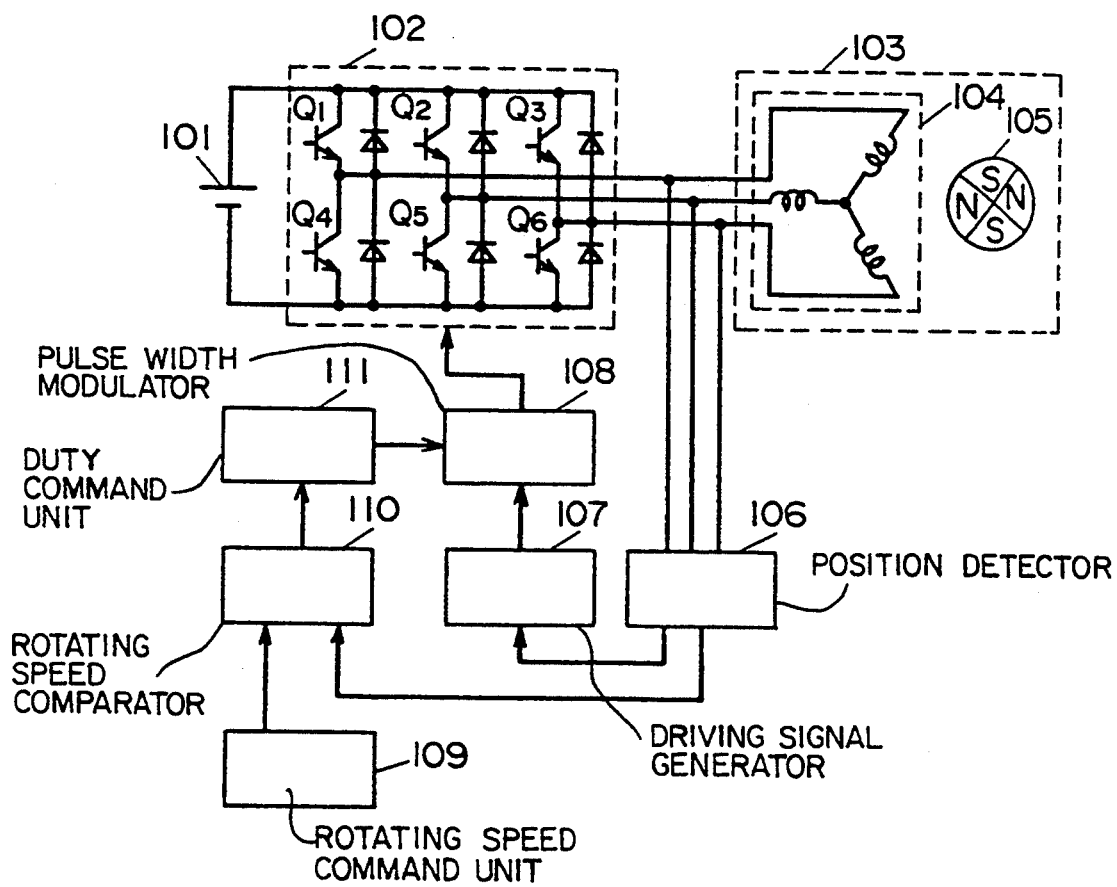
FIG. 2 is a block diagram of a brushless motor driving apparatus in first and second embodiments of the present invention.

FIG. 2 is a block diagram of a brushless motor driving apparatus in the first embodiment of the present invention. In FIG. 2, reference numeral 101 designates a DC power source and numeral 102 designates a semiconductor switching element group which is composed of six transistors $Q_1$ to $Q_6$ and six diodes connected in inverse parallel with the transistors. Numeral 103 designates a brushless motor which is composed of a three-phase connected armature winding 104 and a magnet rotor 105. Numeral 106 designates position detection means, numeral 107 driving signal generation means, numeral 108 pulse width modulation means, numeral 109 rotating speed command means, numeral 110 rotating speed comparison means, and numeral 111 duty command means.

With the above construction, the position detection means 106 detects the position of magnetic poles of the magnet rotor 105 from an induced voltage generated in the armature winding 104, a detection output of the position detection means 106 is sent to the driving signal generation means 107 and an output signal of the driving signal generation means 107 is subjected to pulse width modulation to drive the transistors in the semiconductor switching element group 102, thereby controlling the brushless motor 103.

Figure 3:
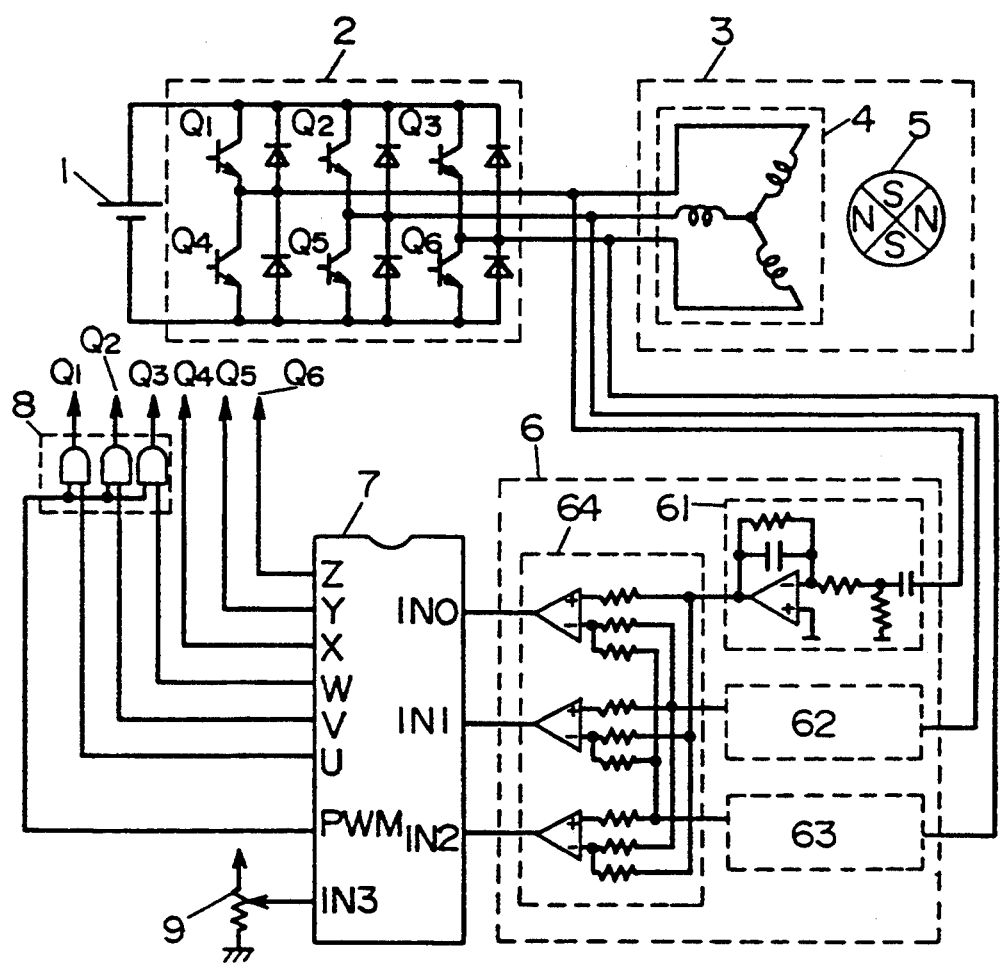
FIG. 3 is a circuit diagram of the brushless motor driving apparatus shown in FIG. 2.

FIG. 3 is a circuit diagram of the brushless motor driving apparatus in the first embodiment of the present invention.

In the figure, reference numeral 1 designates a DC power source and numeral 2 designates a semiconductor switching element group which is composed of six transistors $Q_1$ to $Q_6$ and six diodes connected in inverse parallel with the transistors. Numeral 3 designates a brushless motor which is composed of a three-phase connected armature winding 4 and a magnet rotor 5. Numeral 6 designates a position detection circuit which is composed of three filters 61 to 63 and a group 64 of comparators. Numeral 7 designates a microcomputer, numeral 8 a pulse width modulation circuit, and numeral 9 a rotating speed indication volume. The comparators in the comparator group 64 are connected with input ports $IN_0$ to $IN_2$ of the microcomputer 7. The microcomputer 7 outputs driving signals from output ports U, V, W, X, Y and Z thereof. The output ports U to W are connected to the pulse width modulation circuit 8 and the output ports X to Z are connected to the transistors $Q_4$ to $Q_6$ in the semiconductor switching element group 2. Also, the microcomputer 7 outputs a duty signal from an output port PWM thereof. The output port PWM is connected to the pulse width modulation circuit 8. Outputs of the pulse width modulation circuit 8 are connected to the transistors $Q_1$ to $Q_3$ in the semiconductor switching element group 2.

Figure 4:
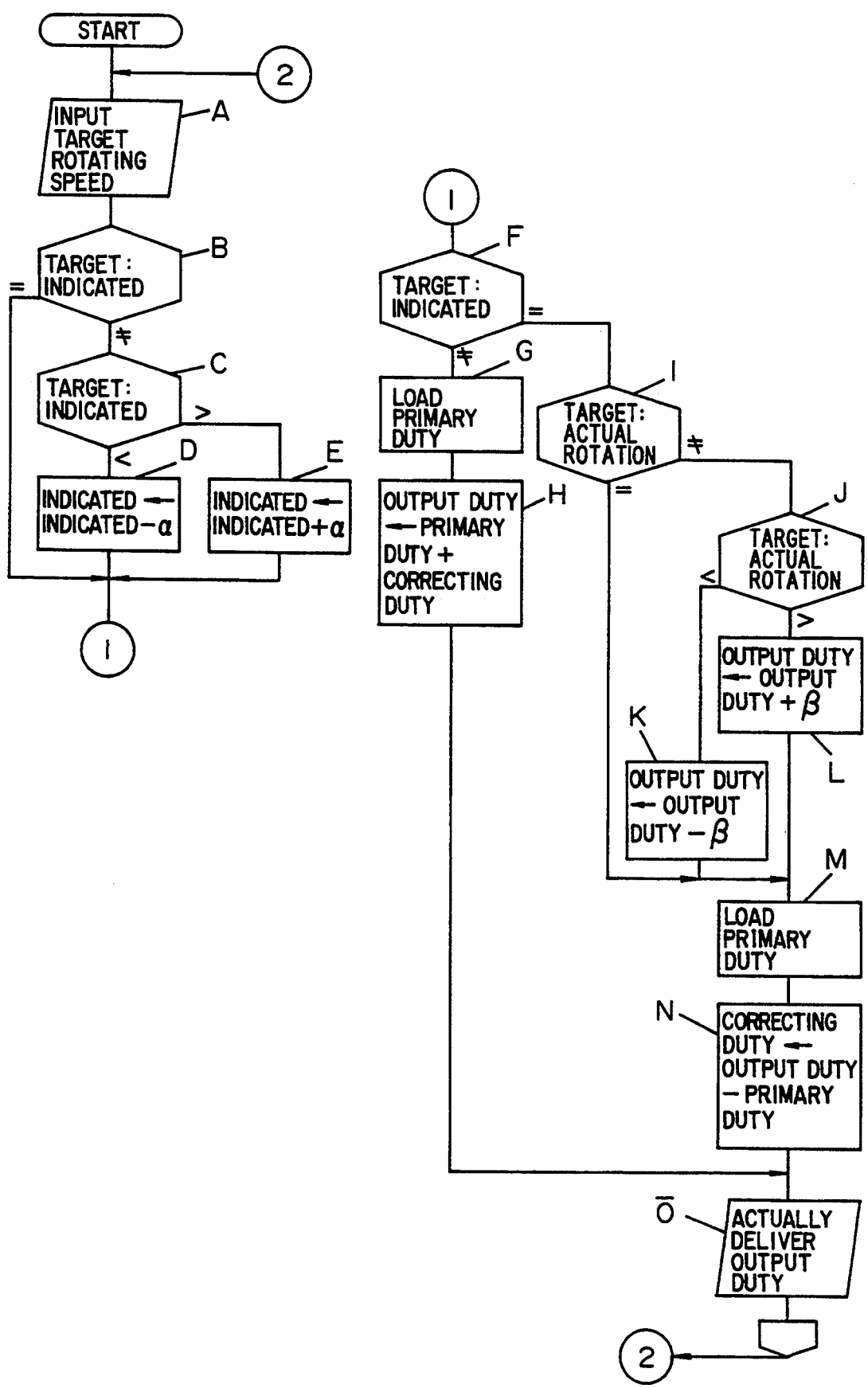
FIG. 4 is a flow chart for explaining the operation of the embodiments.
Figure 5:
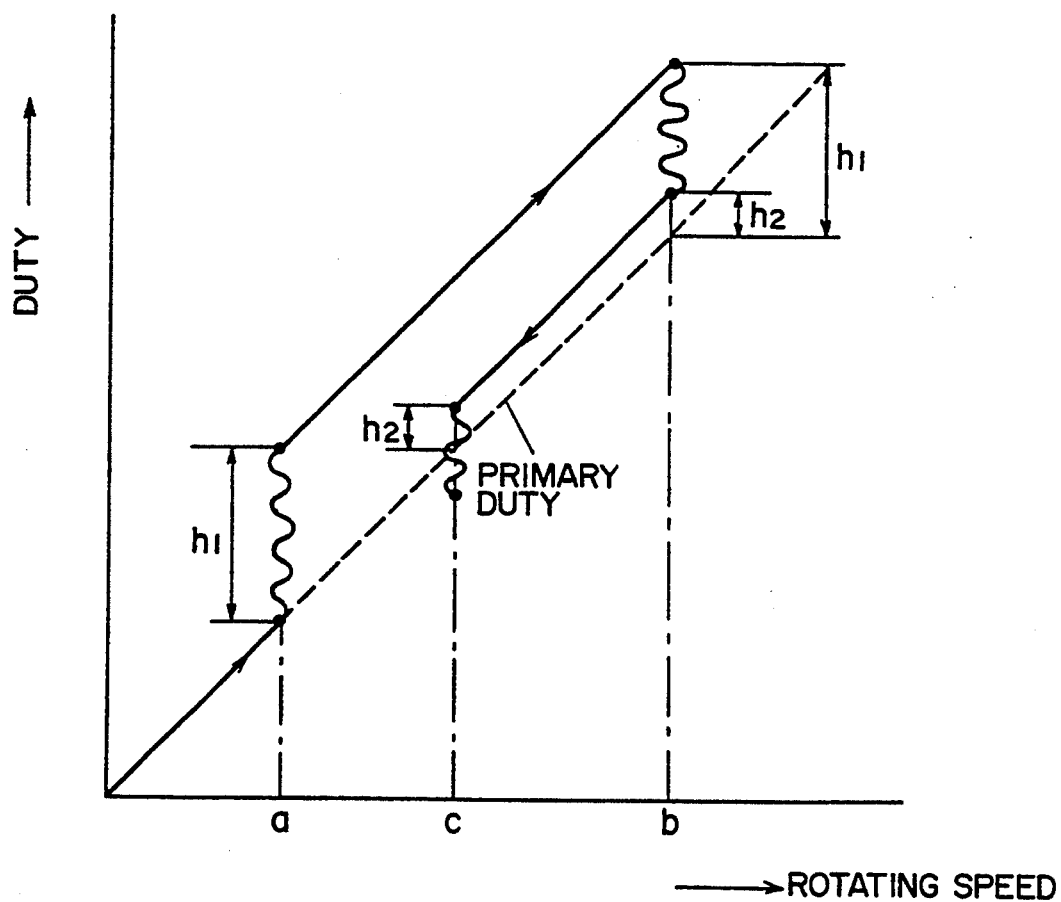
FIG. 5 is a diagram showing a relationship between the rotating speed and duty in the first embodiment of the present invention.

FIG. 4 is a flow chart showing the software of the microcomputer 7. FIG. 5 is a rotating speed versus duty chart. In FIG. 5, a corrugated line portion shows a feedback control.

The operation of the first embodiment of the present invention will be described by use of FIGS. 4 and 5.

Firstly, in step A, a target rotating speed corresponding to the level of a voltage inputted to the input port $IN_3$ is settled. In step B, the comparison of the target rotating speed and an indicated rotating speed is made. The flow proceeds to step F if both the speeds coincide with each other and to step C if they are different from each other. In step C, the target rotating speed is compared with the indicated rotating speed. The flow proceeds to step E if the target rotating speed is higher than the indicated rotating speed and to step D if the target rotating speed is lower than the indicated rotating speed. In step D, the value of subtraction of an arbitrary value $\alpha$ from the indicated rotating speed is set as the indicated rotating speed. In step E, the value of addition of an arbitrary value $\alpha$ to the indicated rotating speed is set as the indicated rotating speed. By properly selecting the values of $\alpha$ to be added and subtracted in steps E and D, the increased and lowered speeds upon change in rotating speed are optimized. It is not necessarily required that the values of $\alpha$ to be added and subtracted in steps E and D are the same. In step F, the comparison of the target rotating speed and the indicated rotating speed is made. The flow proceeds to step I if both the speeds coincide with each other and to step G if they are different from each other. In step G, primary duty data corresponding to the indicated rotating speed is loaded from a table in which predetermined rotating speed versus duty data is stored. In step H, correcting duty data is added to the primary duty data and the value of addition is set as output duty data. And, the flow proceeds to step O. The above operation from steps F to step O through steps G and H is performed at the time of change in rotating speed. In step I, the comparison of the target rotating speed and an actual rotating speed determined from a position detection signal is made. The flow proceeds to step M if both the speeds coincide with each other and to step J if they are different from each other. In step J, the target rotating speed is compared with the actual rotating speed. The flow proceeds to step L if the target rotating speed is higher than the actual rotating speed and to step K if the target rotating speed is lower than the actual rotating speed. In step K, the value of subtraction of an arbitrary value $\beta$ from output duty data is set as the output duty data. In step L, the value of addition of an arbitrary value $\beta$ to the output duty data is set as the output duty data. By properly selecting the values of $\beta$ to be added and subtracted in steps L and K, the increased and lowered speeds upon feedback control are optimized. It is not necessarily required that the values of $\beta$ to be added and subtracted in steps L and K are the same. In step M, primary duty data corresponding to the indicated rotating speed is loaded from a table in which predetermined rotating speed versus duty data is stored. In step N, the primary duty data is subtracted from the output duty data and the value of subtraction is set as correcting duty data. This correcting duty data corresponds to $h_1$ or $h_2$ shown in FIG. 5. The above operation in steps I, J, K, L, M and N is performed at the time of stable rotating speed, thereby making a feedback control of duty based on the actual rotating speed. In step O, a pulse output is delivered from the output port PWM in accordance with the output duty data. Subsequently, the flow returns to step A and the above processing is repeated.

Next, a second embodiment of the present invention will be described by virtue of FIG. 6.

Since the construction and software of an apparatus in the second embodiment are the same as those of the apparatus in the first embodiment, explanation thereof will be omitted.

In the second embodiment, the gradient of a rotating speed versus duty curve is used as a base upon change in rotating speed is changed so as to have different values at the time of low-speed rotation and at the time of high-speed rotation, respectively. Thereby, a duty control along the changed curve is possible. The operation other than the above-mentioned is similar to that in the first embodiment.

Figure 6:
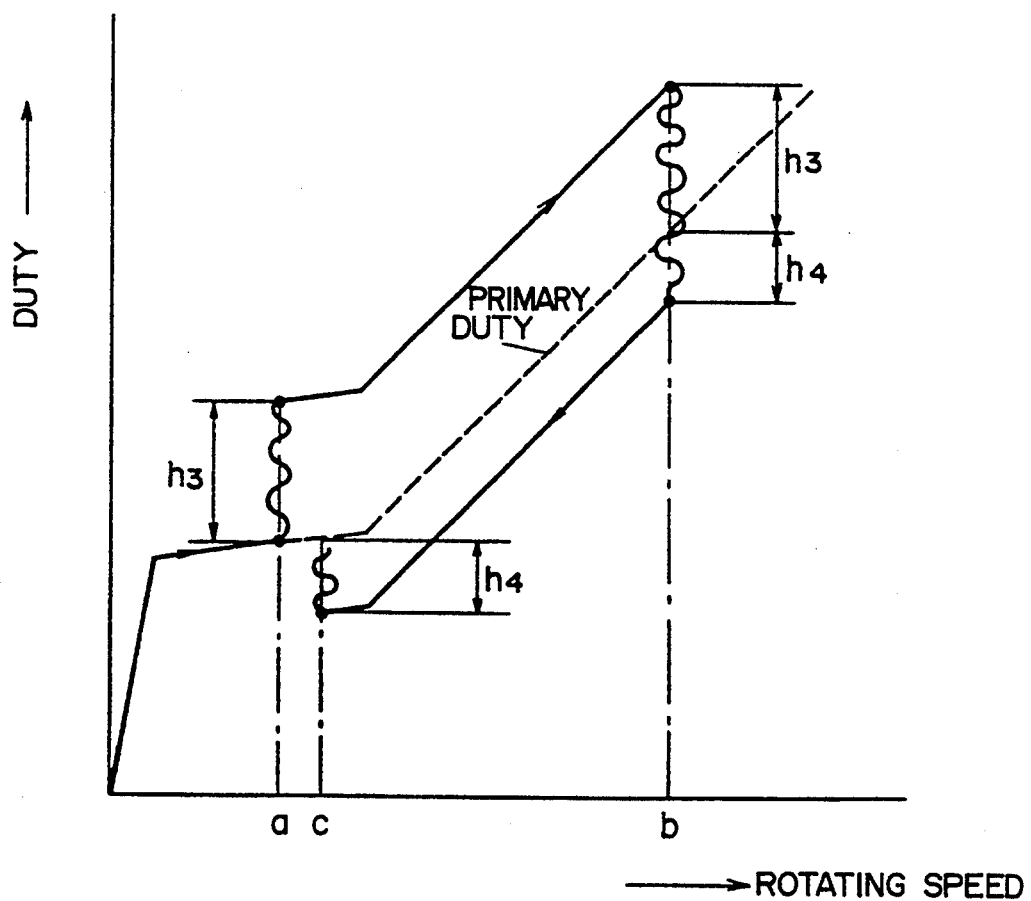
FIG. 6 is a diagram showing a relationship between the rotating speed and duty in the second embodiment of the present invention.

With the above operation, even if a load at the time of high-speed rotation (a) is light so that correcting duty data $h_4$ is minus, as at a point of a rotating speed (c) in FIG. 6, a sufficient duty for driving of the motor can be obtained. Accordingly, the lowering of an application voltage upon light load or at the time of a low power source voltage can be prevented, thereby suppressing the generation of the out-of-step phenomenon.

In the present embodiment, the gradient of the rotating speed versus duty curve is changed. Similar effect can be obtained by restricting a lower limit of the duty.

INDUSTRIAL APPLICABILITY

Further, the provision of the change of the gradient of a predetermined rotating speed versus duty curve with different values at the time of low-speed rotation and at the time of high-speed rotation causes the increase of an application voltage at the time of low-speed rotation, thereby making it possible to prevent the out-of-step phenomenon which may be caused by the undershoot of the application voltage upon transition to low-speed rotation or at the time of low power source voltage. Practically, therefore, the present invention is very useful.

We claim:

1. A driving method for a brushless motor having windings and a magnet rotor, said method comprising:
   determining an actual rotating speed of the motor by detecting and processing of voltage signals induced in the windings of the brushless motor;
   inputting a target rotating speed;
   performing feedback control wherein a duty control operation for controlling a voltage applied to the brushless motor is made on the basis of a comparison between the actual rotating speed of the brushless motor and the target rotating speed;
   determining correcting duty data by comparing the duty output by the duty control with a duty value taken from a predetermined rotating speed versus duty curve; and
   in response to a change of the target rotating speed, performing the duty control on the basis of the predetermined rotating speed versus duty curve and the correcting duty data,
   wherein the gradient of the predetermined rotating speed versus duty curve is changed so as to have different values at a time of low speed rotation and at a time of high speed rotation, respectively.

2. A driving method for a brushless motor having windings and a magnet rotor, said method comprising:
   determining an actual rotating speed of the motor by detecting and processing of voltage signals induced in the windings of the brushless motor;
   inputting a target rotating speed;
   performing feedback control wherein a duty control operation for controlling a voltage applied to the brushless motor is made on the basis of a comparison between the actual rotating speed of the brushless motor and the target rotating speed;
   determining correcting duty data by comparing the duty output by the duty control with a duty value taken from a predetermined rotating speed versus duty curve; and
   in response to a change of the target rotating speed, performing the duty control on the basis of the predetermined rotating speed versus duty curve and the correcting duty data,
   wherein after change of the target rotating speed, an indicated rotating speed is gradually adapted to the new target rotating speed and the duty control is made on the basis of the indicated rotating speed, the predetermined rotating speed versus duty curve and additional correcting duty data until the indicated rotating speed reaches the target rotating speed, and the gradient of the predetermined rotating speed versus duty curve is changed so as to have different values at a time of low speed rotation and at a time of high speed rotation, respectively.

3. A brushless motor driving apparatus for driving a brushless motor having an armature and a magnet rotor, said apparatus comprising:
   a DC power source;
   a group of semiconductor switching elements for passing/interrupting a current to said armature winding;
   rotating speed command means for setting a target rotating speed;
   position detection means for detecting the relative position of said armature winding and said magnet rotor in accordance with a voltage signal induced in said armature winding, and generating an output signal in response thereto;
   driving signal generation means for generating a driving signal of said switching element group by use of said output signal of said position detection means;
   rotating speed comparison means for determining an actual rotating speed of said motor by use of the output signal of said position detection means and comparing the determined actual rotating speed with said target rotating speed set in said rotating speed command means;
   means for storing a predetermined rotating speed versus duty curve;
   duty command means for generating a duty command, wherein feedback duty control is performed on the basis of a comparison between the actual rotating speed and the target rotating speed;
   pulse width modulation means for subjecting an output signal of said driving signal generation means to pulse width modulation on the basis of said duty command from said duty command means; and
   means for determining correcting duty data on the basis of a comparison between the duty output by said pulse width modulation means with the duty taken from said predetermined rotating speed versus duty curve;
   wherein said duty command means changes the duty command at the time of change in target rotating speed on the basis of the predetermined rotating speed versus duty curve and said correcting duty data, and
   the gradient of said predetermined rotating speed versus duty curve is changed so as to have different values at a time of low-speed rotation and at a time of high-speed rotation, respectively.

* * * * *